US011023307B2

(12) United States Patent
Attard et al.

(10) Patent No.: US 11,023,307 B2
(45) Date of Patent: Jun. 1, 2021

(54) AUTOMATIC REMEDIATION OF DISTRIBUTED STORAGE SYSTEM NODE COMPONENTS THROUGH VISUALIZATION

(71) Applicant: International Business Machines Corporation, Armonk, NY (US)

(72) Inventors: Ryan J. Attard, Chicago, IL (US); Bart R. Cilfone, Marina del Rey, CA (US); Patrick A. Tamborski, Chicago, IL (US); Sanjaya Kumar, South Elgin, IL (US); Eric Tashakkor, Des Plaines, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/238,809

(22) Filed: Jan. 3, 2019

(65) Prior Publication Data

US 2020/0218593 A1 Jul. 9, 2020

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01); *G06F 11/0751* (2013.01); *G06F 11/0769* (2013.01)

(58) Field of Classification Search
CPC ............. G06F 11/0793; G06F 11/0709; G06F 11/0751; G06F 11/0769
See application file for complete search history.

(56) References Cited

U.S. PATENT DOCUMENTS

| 9,148,479 | B1 | 9/2015 | Bhalerao et al. |
| 9,323,636 | B2 | 4/2016 | Xia et al. |
| 9,531,585 | B2 | 12/2016 | Daud et al. |
| 9,654,346 | B2 | 5/2017 | Kumar |
| 9,800,459 | B1 | 10/2017 | Fair |
| 10,069,914 | B1* | 9/2018 | Smith ................. H04L 63/0428 |
| 10,684,928 | B1* | 6/2020 | Straw ................. G06F 11/3055 |
| 2011/0289566 | A1 | 11/2011 | Resch et al. |

(Continued)

OTHER PUBLICATIONS

Ahmed, J.; Mideast Data Systems blogs about how to achieve deep infrastructure monitoring along with impressive visualization; Jul. 4, 2014; 4 pgs; Savision [online article].

(Continued)

*Primary Examiner* — Katherine Lin
(74) *Attorney, Agent, or Firm* — James Nock; Andrew D. Wright; Roberts, Calderon, Safran & Cole, P.C.

(57) ABSTRACT

A method for execution by one or more processing modules of one or more computing devices of a dispersed storage network (DSN), the method begins by gathering, at a DSN management unit, an abstracted DSN node hardware configuration and associated node health information for a plurality of DSN nodes residing in the DSN. The method continues by generating a graphical display indicating a state and a presence of the plurality of DSN nodes and associated hardware. The method continues by performing, at the DSN management unit, specific remediating actions on the plurality of DSN nodes based on the state and presence of the plurality of DSN nodes and associated hardware.

20 Claims, 7 Drawing Sheets

(56) References Cited

U.S. PATENT DOCUMENTS

| | | | |
|---|---|---|---|
| 2012/0198066 A1* | 8/2012 | Grube | G06F 11/1076 |
| | | | 709/225 |
| 2013/0138706 A1 | 5/2013 | Dhuse et al. | |
| 2014/0070756 A1* | 3/2014 | Kearns | H02J 13/0006 |
| | | | 320/101 |
| 2016/0119204 A1 | 4/2016 | Murasato et al. | |
| 2016/0285707 A1* | 9/2016 | Pawlowski | G06F 3/04842 |
| 2016/0371145 A1* | 12/2016 | Akutsu | H04L 67/1097 |
| 2017/0116231 A1 | 4/2017 | Kripalani et al. | |
| 2017/0249203 A1 | 8/2017 | Motwani et al. | |
| 2018/0124174 A1 | 5/2018 | Swallow et al. | |
| 2018/0143868 A1 | 5/2018 | Johnston et al. | |
| 2018/0373887 A1* | 12/2018 | Smith | G06F 3/067 |
| 2020/0133582 A1 | 4/2020 | Volvoski et al. | |

OTHER PUBLICATIONS

List of IBM Patents or Applications Treated as Related, Jan. 3, 2019, 2 pages.

Office Action dated Jul. 9, 2020 in related U.S. Appl. No. 16/238,631, 11 pages.

Notice of Allowance dated Nov. 25, 2020 in related U.S. Appl. No. 16/238,631, 5 pages.

Anonymous, "Search Strategy from Dialog", STIC Scientific and Technical Information Center, Nov. 19, 2020, 3 pages.

* cited by examiner

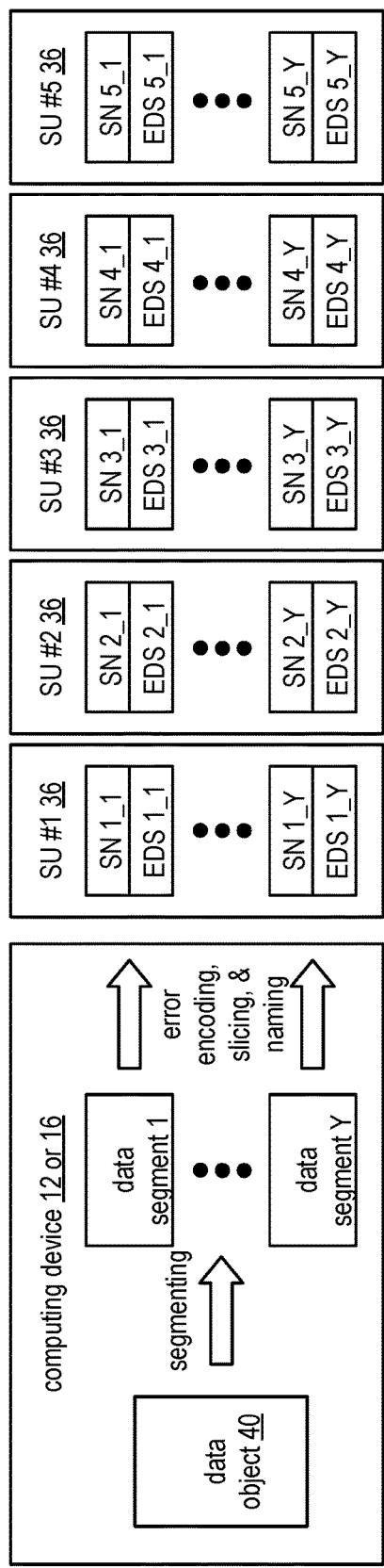
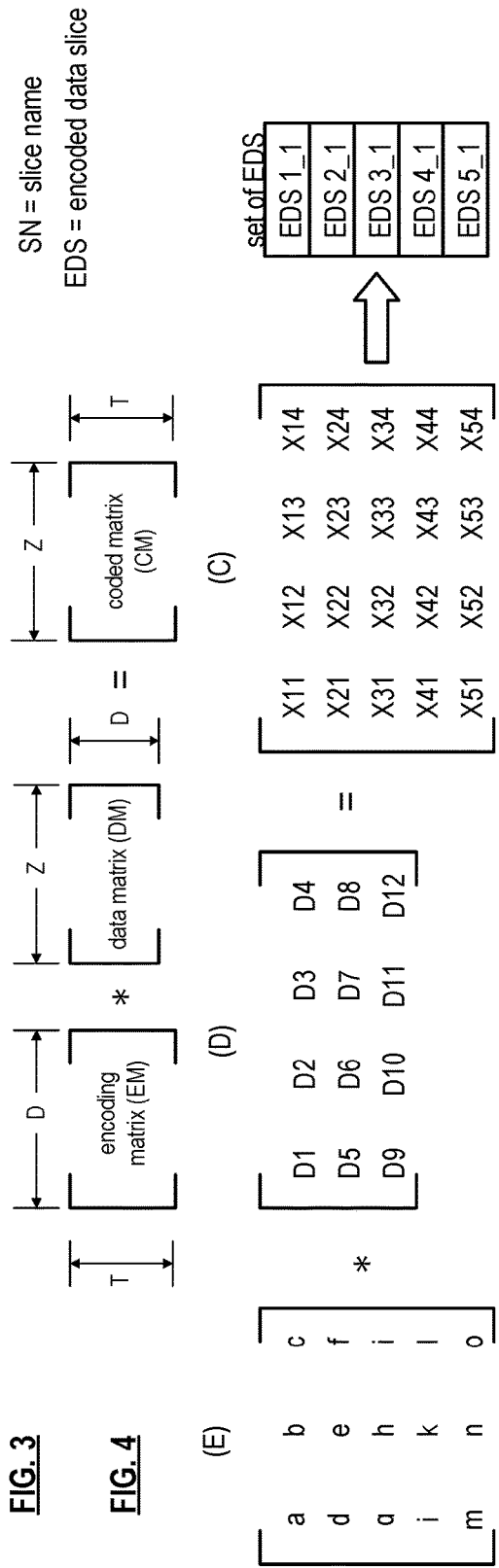
FIG. 3
FIG. 4
FIG. 5
FIG. 6

AUTOMATIC REMEDIATION OF DISTRIBUTED STORAGE SYSTEM NODE COMPONENTS THROUGH VISUALIZATION

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
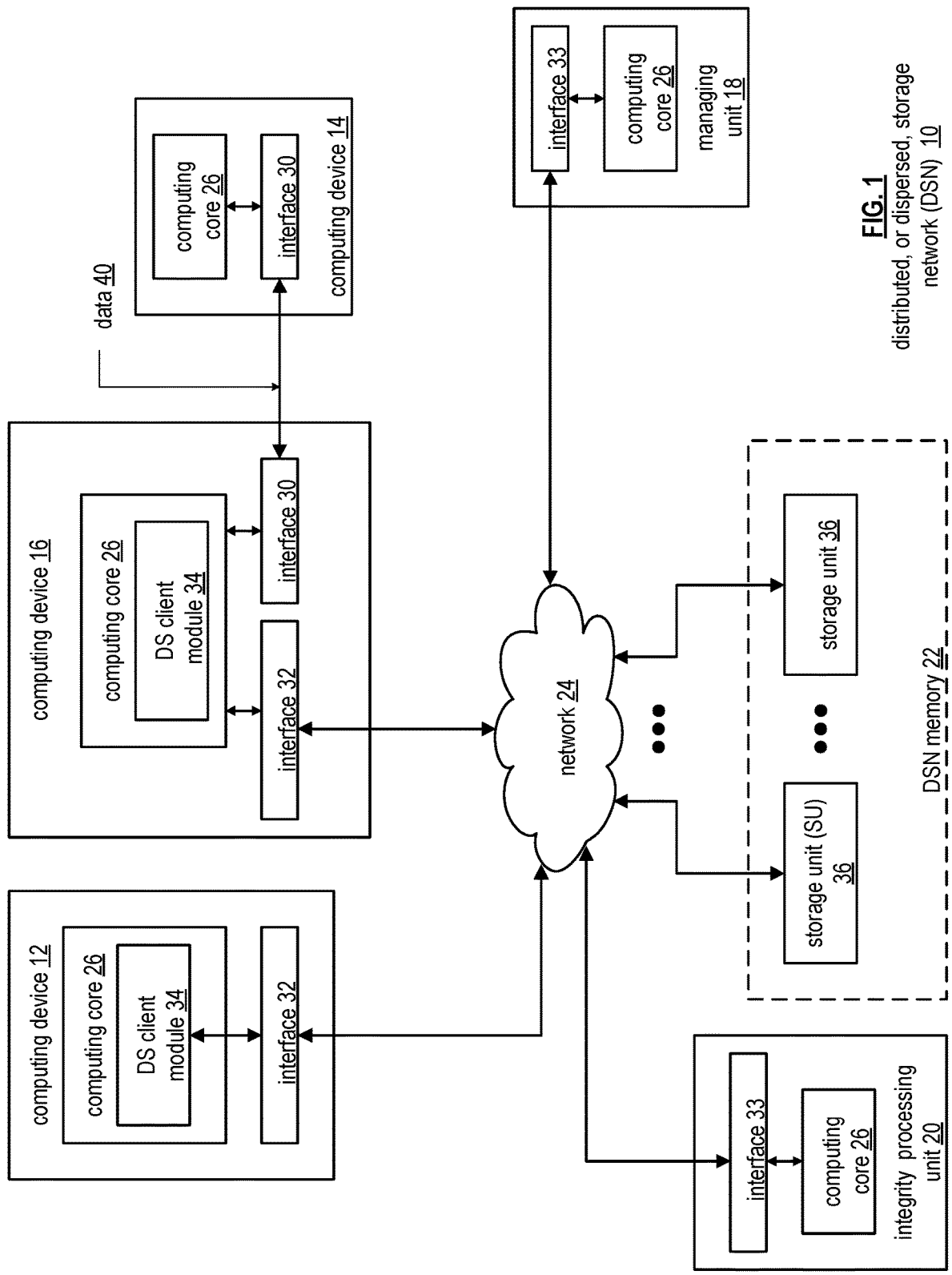
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
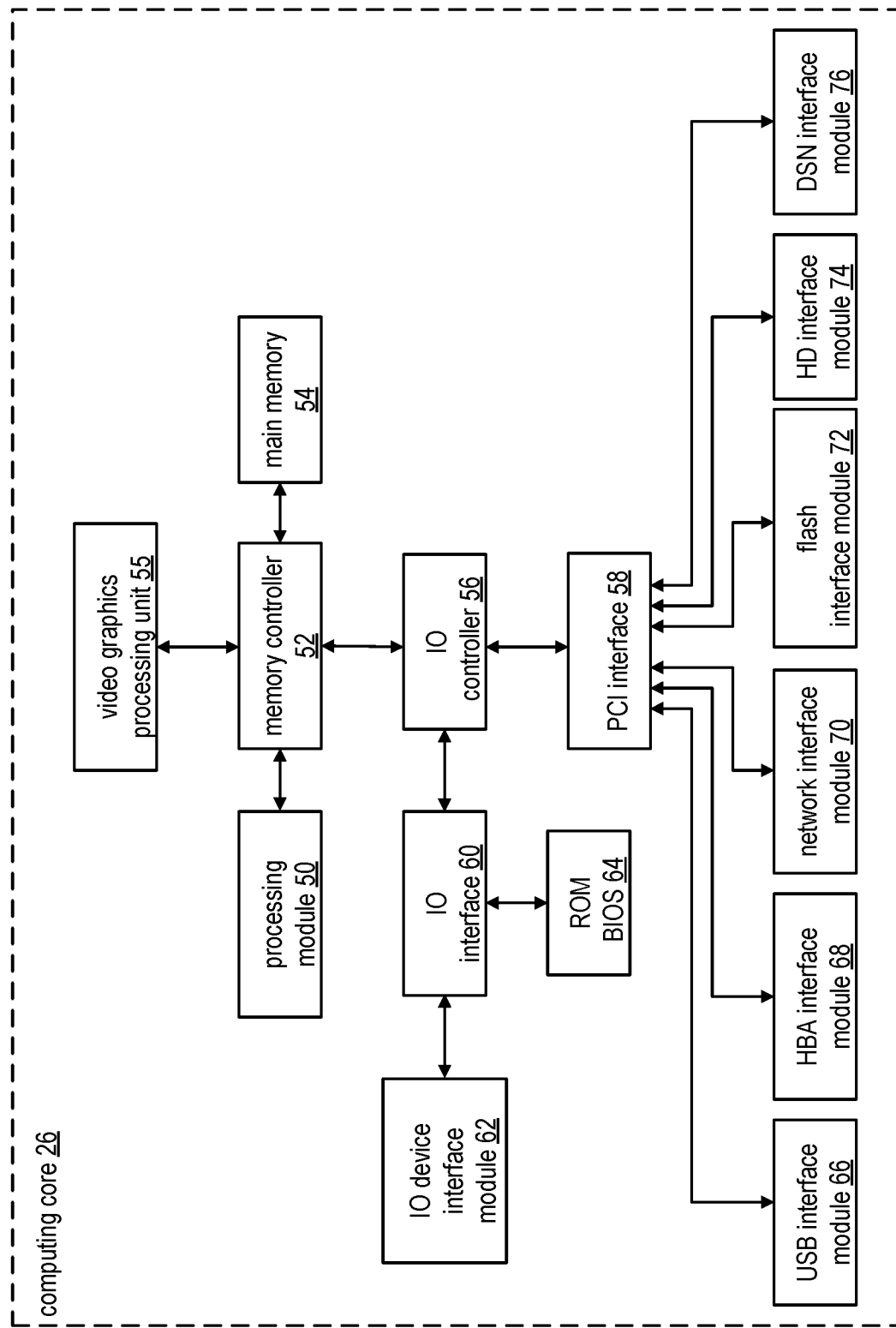
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-9B. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent on the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
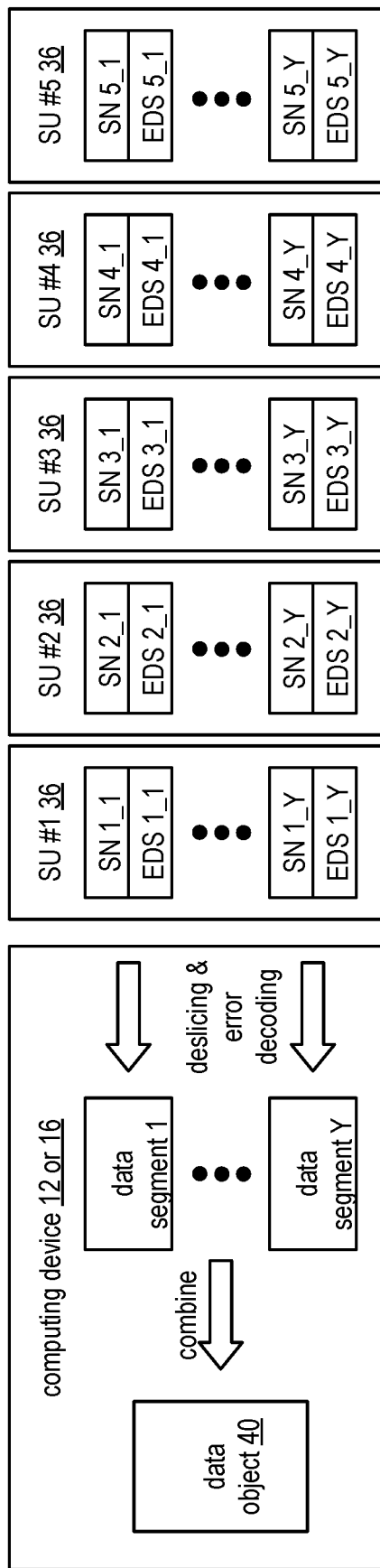
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
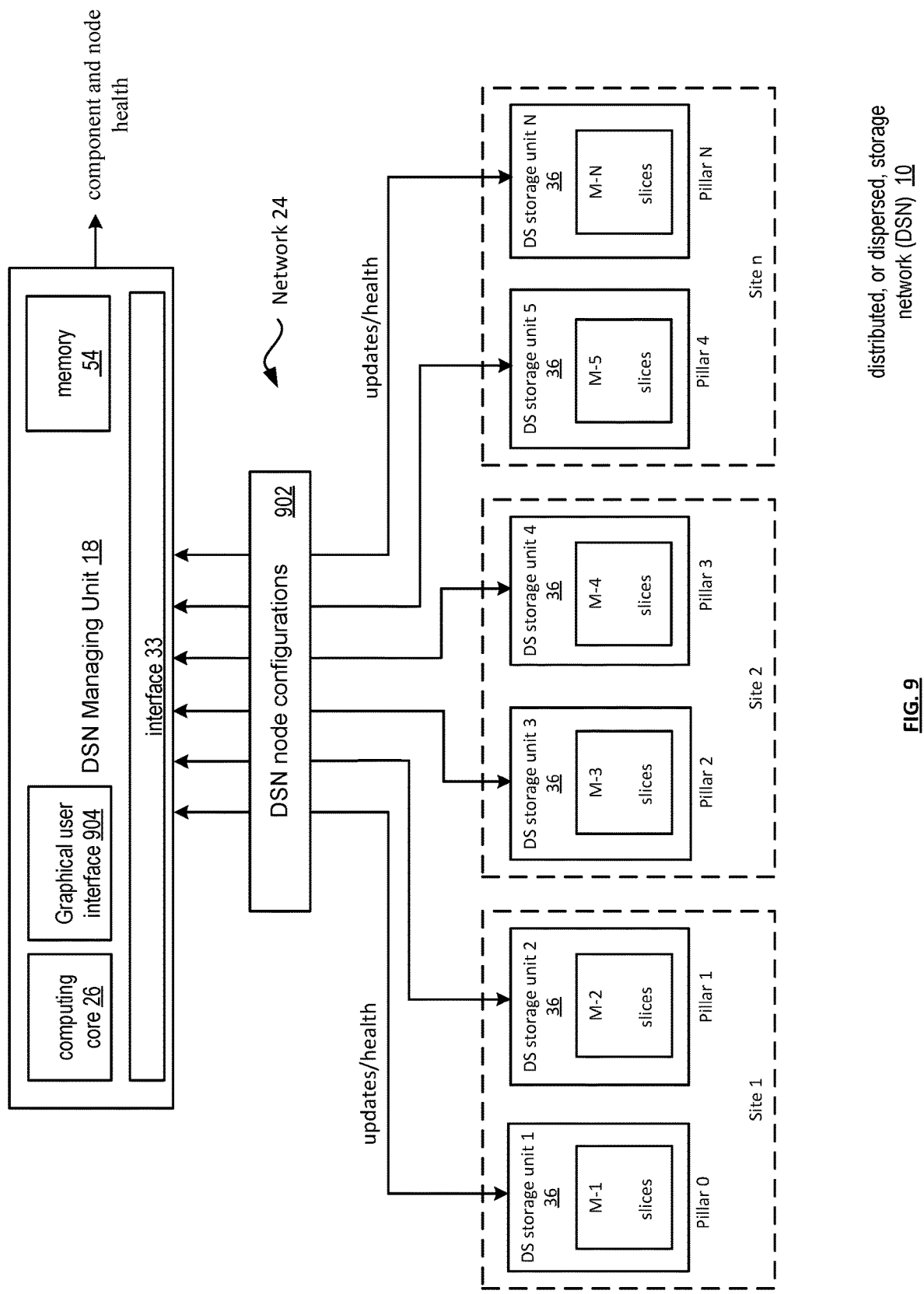
FIG. 9 is a schematic block diagram of an example of distributed storage network node configurations in accordance with the present invention.

FIG. 9 is a schematic block diagram of an example of distributed storage network node configurations in accordance with the present invention. Dispersed storage network (DSN) 10 includes at least DSN managing unit 18, DSN memory 22 apportioned into (sites (1-n)) each with a subset of a plurality of DS storage units (1-N). Each storage unit also includes a plurality of DSN memories M-1 through M-N (e.g., hard drives, static memory, solid state memory, optical memory, etc.) storing encoded data slices. DSN managing unit 18 is communicatively connected to sites 1-n through network 24 of FIG. 1. In this example embodiment, six DS storage units (storing pillar 0-pillar N) are located at three different sites; pillars 0-1 are located at site 1, pillars 2-3 are located at site 2, and pillars 4-N are located at site N.

DSN managing unit 18 includes the computing core 26 and memory 54 of FIG. 2 and an interface, which can include, for example, interface 30, 32, and/or 33 of FIG. 1. In addition, graphical user interface 904 provides operators an opportunity to visualize node configuration hardware component states and associated health to perform remediation of DSN nodes with component and/or health issues (e.g., hardware component failures). While shown as integrated into the DSN managing unit, GUI 904 can, in alternative embodiments, be instantiated externally in other units of the DSN (e.g., computing device 16), with DSN node component and health information fed to the external GUI from DSN managing unit 18. Each DSN storage site (1-n) can include the same number or a different number of storage units k. Each DSN memory can, for example, be utilized by DSN memory 22 of FIG. 1, and each storage unit can, for example, be utilized by storage unit 36 of FIG. 1.

The DSN includes a multitude of storage nodes for storage of data objects (as encoded data slices). The multitude of storage nodes may be organized into one or more storage node sets. Each storage node of the plurality of storage nodes may be implemented utilizing at least one of a storage server, a storage unit, a storage module, a memory device, a memory, a distributed storage (DS) unit, a DS processing unit, a distributed storage and task (DST) execution unit, a user device, a DST processing unit, and a DST processing module.

Components and memory devices will eventually degrade in a DSN memory. When this occurs, remote system operators need to communicate how to perform remediation actions to the on-site technicians. The technology described herein provides a mechanism to simplify this process.

In traditional systems and DSNs, nodes have different properties that require specific knowledge to perform operations on how to replace failing components and accurately gauge the health of the node. To ease the process of completing remediation actions, a DSN node is configured automatically at deployment time. A system operator can modify this DSN node configuration 902 to enable/disable specific hardware features, and may manipulate the behavior of a node by modifying the DSN node configuration of any node to test hardware failure scenarios and component replacement procedures. The DSN node reports its configuration 902 to the DSN management unit 18 using a DSN management protocol. The DSN management unit then uses that configuration to provide the operator with status on component and DSN node health. Throughout the technical descriptions and claims, the terms failed and failing are interchangeable. Remediation for either status is considered within the scope of the present disclosure. For example, a hard drive that is nearly full may soon be considered failing as it may soon be unavailable for additional encoded data slice storage. A specific remediation may include an upgrade, replacement or encoded data slice migration to a new larger hard drive.

By having the DSN node report the specifics of the hardware properties, the DSN management unit can generate health checks to be tailored to an individual DSN node configuration without prior knowledge of the DSN node hardware properties. The DSN node configuration allows for fine-tuning of node behavior based on its hardware characteristics and enables the operator to support a variety of node classes with various hardware properties through a DSN management interface. In addition, nodes in a DSN may have their own hardware vendor supplied management protocol which are not interoperable with each other, making it difficult for an operator to understand the implications of node health on the DSN system. By enabling node-specific property monitoring, the operator can better gauge the health and reliability of their DSN and can more proactively perform replacement operations on failed components.

For a DSN node containing a set of hardware components, operators may not have the knowledge required to assess the health without knowledge of the underlying hardware. This mechanism enables a DSN operator to understand the health of an individual DSN node health without requiring prior knowledge of the DSN node. By abstracting the hardware specific knowledge (e.g., hardware abstraction layer (HAL)) of a node through automatic configuration at the time of deployment, the operator does not require intimate knowledge of the hardware of a DSN memory during the product lifecycle. Hardware abstractions can include sets of routines in software that emulate some hardware-specific details, giving programs direct access to the hardware resources. One function is to hide differences in hardware from most of the operating system kernel, so that most of the kernel-mode code does not need to be changed to run on systems with different hardware.

Typically, DSN managing unit 18 is responsible for memory management, monitoring, and debugging across multiple DSN components and memories. In various embodiments, DSN managing unit 18 performs memory management, monitoring, and debugging by transmitting DSN node configuration update requests to each DSN node (e.g., DSN site(s) or DS storage unit(s)), which in turn push appropriate update requests to the DSN nodes. In response, the DSN nodes can transmit requested logs and/or statistics back to DSN management unit 18 for aggregation, analysis, and/or storage.

DSN nodes are configured during deployment with the DSN node configurations reported to the DSN management unit 18 as hardware abstractions with operator modifications based on specific hardware features, hardware failure scenarios or component replacement procedures. Management unit 18 receives modified node configurations based on a DSN management protocol and can provide operators with a status on component and node health.

DSN node configuration parameters can specify a hardware abstraction configuration update to one or more DSN components of the DSN node, such as one or more storage units, one or more computing devices, one or more integrity processing units 20 of FIG. 1, one or more managing units 18 of FIG. 1, or other components present in the DSN. The configuration parameters can further specify component parameters of the one of more components to be enabled or overridden, specify new values the component parameters should be set to, specify which software releases to apply against, and/or specify the set of components to which the update applies.

In traditional systems and DSNs, hardware layout can vary and identifying information for them is inconsistent. Using an automatic DSN node hardware configuration, information about a DSN node's hardware properties is available on DSN management units. A visualization of a DSN node enables an operator to more accurately instruct site technicians to perform component repair operations on nodes without specific training or knowledge, while reducing turnaround time for component failure remediation. The DSN management unit will use this information to provide a graphical display indicating the state and presence of components in the system.

The DSN management unit presents current and historical information about node health in graphical format to reduce the complexity and prior knowledge required to understand the health, performance, and configurations of their nodes. Operators can use the graphical user interface to instruct site technicians to perform maintenance actions automatically on the system and to perform specific hardware functions on the node, including setting fault indicators for site technicians, and removing connectivity to a failed component to be replaced at a later date. Visualizing DSN nodes enables operators and site technicians to support larger DSN memories containing a broader variety of hardware types. Visualizing the node eliminates the need for retrieval of dedicated hardware manuals, or generation of specific procedures for different hardware components by making it easier to automatically identify and remediate failed components in a DSN node.

In various embodiments, data from DSN nodes, such as logs and/or statistics, are desired for the purpose of monitoring changes in the DSN nodes, for example, to monitor DSN node configuration updates or node health related issues. The DSN configuration parameters can indicate a set of statistics and/or logs to collect, what time frames to collect over, and/or other information relating to statistics collection from one or more DSN nodes and/or components in the DSN. The specified statistics and/logs can be based on data that would be specifically relevant to the DSN node configuration. Each DSN node unit can periodically communicate with DSN management unit 18 and/or a particular instance to receive the latest configuration abstraction and related health of components of the node.

In various embodiments, DSN managing unit 18, upon receiving the logs and/or statistics from each managing unit, can further parse, filter, aggregate, and/or compress the data. DSN managing unit 18 can perform analysis, such as searching for health of components in the data, organizing and/or categorizing data, and/or determining or projecting when future storage may be needed (e.g., upgrades).

Figure 9A:
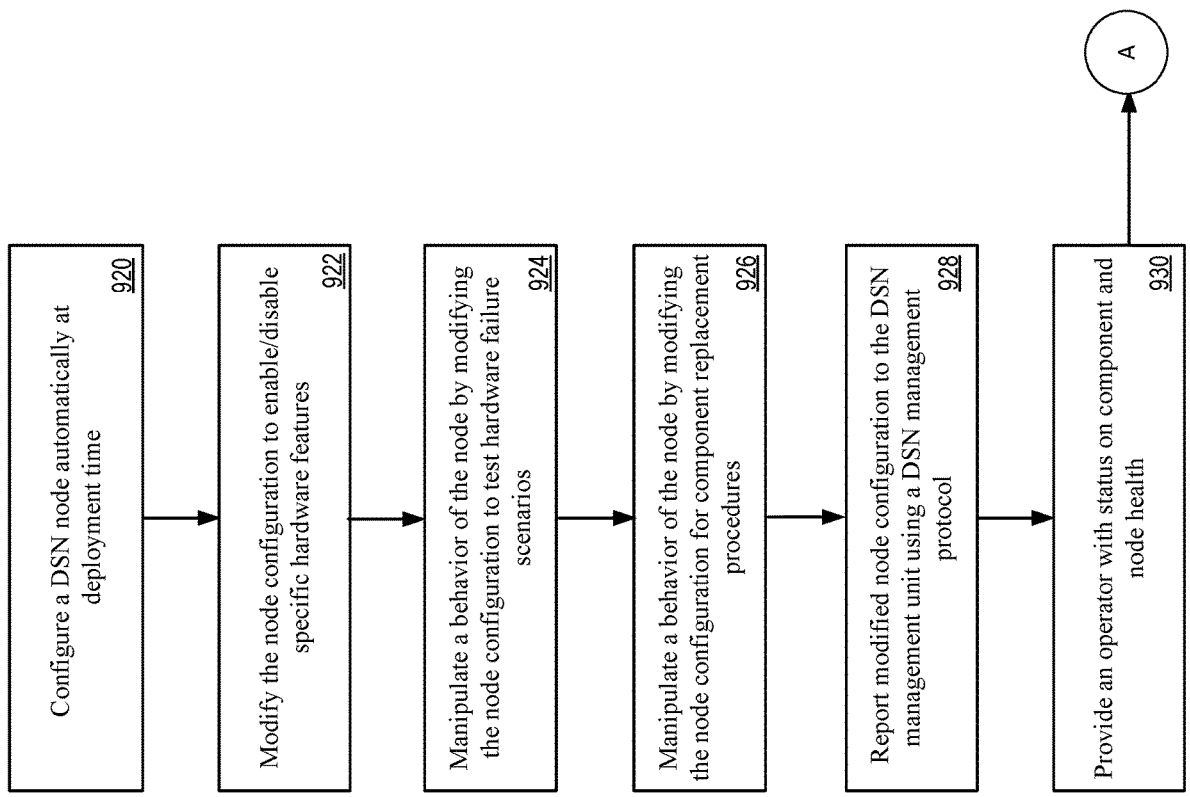
FIG. 9A is a diagram illustrating an example of distributed storage network node configuration in accordance with the present invention.

FIG. 9A is a diagram illustrating an example of distributed storage network node configuration. In particular, a method is presented for use in conjunction with one or more functions and features described in conjunction with FIGS. 1-2, 3-8, and also FIG. 9.

The method illustrated is for execution by one or more processing modules of one or more computing devices of a dispersed storage network (DSN). The method begins in step 920 by determining a DSN node configuration automatically during deployment. DSN nodes are configured during deployment with the DSN node configurations reported to the DSN management unit 18 as hardware abstractions with modifications based on hardware features, hardware failure scenarios or component replacement procedures as further described below.

The method continues in step 922 by modifying the abstracted DSN node configuration to enable/disable specific hardware features. The abstracted DSN node configuration parameters can specify a hardware abstraction configuration update to one or more DSN components of the DSN node, such as one or more storage units, one or more computing devices, one or more integrity processing units 20 of FIG. 1, one or more managing units 18 of FIG. 1, or other components present in the DSN node. The configuration parameters can further specify component parameters of the one of more components to be enabled or overridden, specify new values the component parameters should be set to, specify which software releases to apply against, and/or specify the set of components to which the configuration update applies.

The method continues in step 924 by modifying the abstracted DSN node configuration to test hardware failure scenarios. The hardware failure scenarios can be any of known or predicted: hardware specific failures, location specific failures, environment specific failures (e.g., temperature, humidity, weather, etc.), age of components at time of deployment, generation of components, compatibility with existing or new components, etc.). Modifying the abstracted DSN node configuration for hardware failure scenarios can, in one embodiment, change the behavior of the DSN node.

The method continues in step 926 by modifying the abstracted DSN node configuration for component replacement procedures. Modifying the abstracted DSN node configuration for component replacement procedures can, in one embodiment, change the behavior of the DSN node.

The method continues in step 928 by reporting the modified abstracted DSN node configuration to a DSN management unit. Management unit 18 receives modified node configurations based on a DSN management protocol and can provide operators with a status on component and node health.

The method continues in step 930 by providing a status on component health and overall health of the DSN node to an operator of the DSN. Data from DSN nodes, such as logs and/or statistics, are desired for the purpose of monitoring changes in the DSN nodes, for example, to monitor DSN node updates or node/component health related issues. The DSN configuration parameters can indicate a set of statistics and/or logs to collect, what time frames to collect over, and/or other information relating to statistics collection from one or more DSN nodes and/or components in the DSN. The specified statistics and/logs can be based on data that would be specifically relevant to the DSN node configuration. Each DSN node unit can periodically communicate with DSN management unit 18 and/or a particular instance to receive the latest configuration abstraction and related health of components of the node.

Figure 9B:
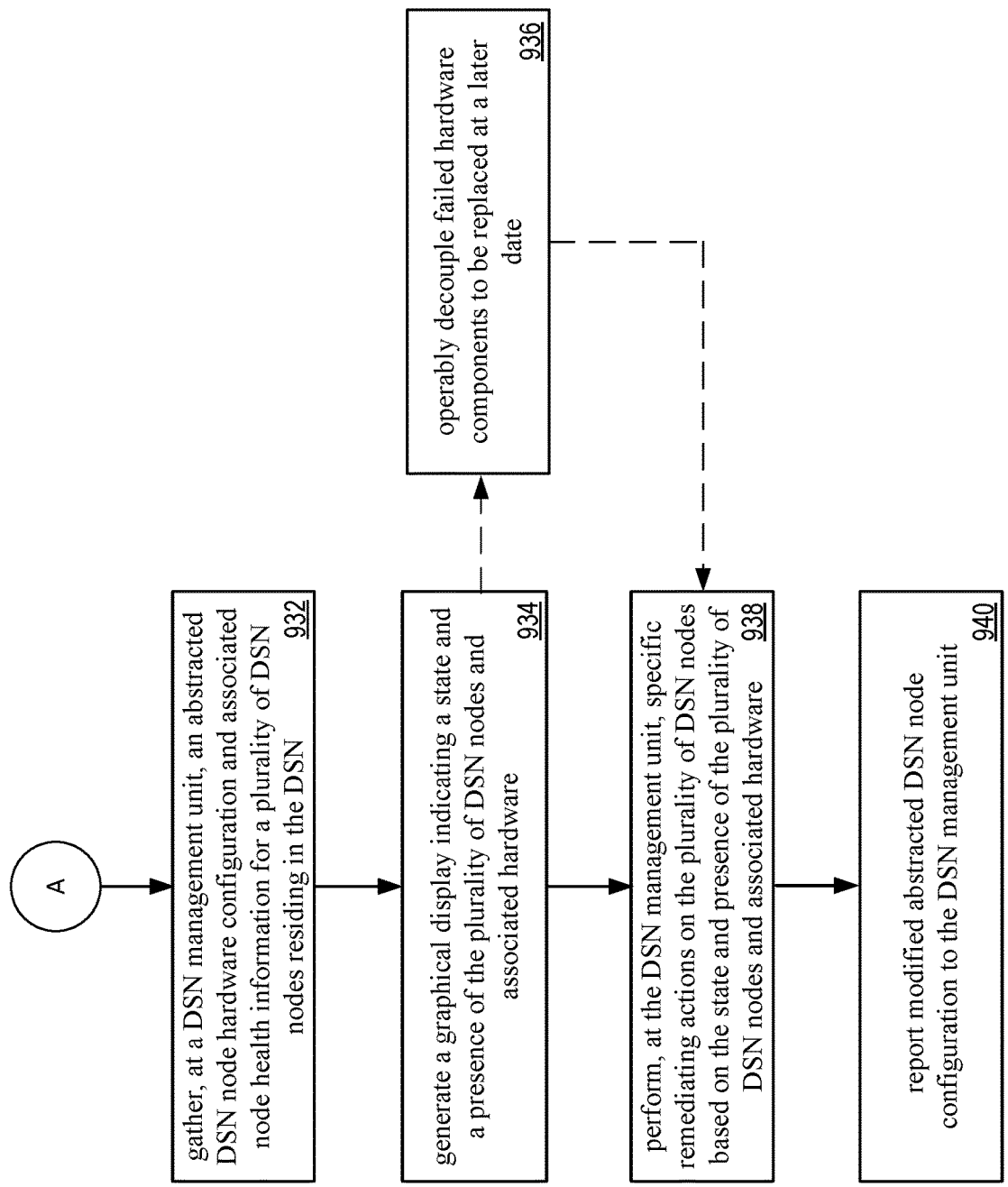
FIG. 9B is a diagram illustrating an example of distributed storage network node remediation in accordance with the present invention.

FIG. 9B is a diagram illustrating an example of distributed storage network node remediation. In particular, a method is presented for use in conjunction with one or more functions and features described in conjunction with FIGS. 1-2, 3-8, and also FIGS. 9 and 9A.

The method illustrated is for execution by one or more processing modules of one or more computing devices of a dispersed storage network (DSN). The method begins, in step 932, by gathering at a DSN management unit an abstracted DSN node hardware configuration and associated node health information (as previously obtained in FIG. 9A) for a plurality of DSN nodes residing in the DSN.

The method continues in step 934 by generating a graphical display visualizing a state and a presence of the plurality of DSN nodes and associated hardware. The state and presence of the plurality of DSN nodes and associated hardware are fed to an operator of the DSN through the graphical display. For example, the visualization of a state and presence of the associated hardware components can indicate failure of one or more hardware components and specific remediating actions for the failed hardware components (e.g., steps for repair or replacement).

The method continues, in optional step 936, by operably decoupling failed hardware components to be replaced at a later date. For example, time may be needed to schedule on-site technicians and obtain appropriate replacement hardware components.

The method continues, in step 938, by performing at the DSN management unit specific remediating actions on the plurality of DSN nodes based on the state and presence of the plurality of DSN nodes and associated hardware. In one example, specific remediating actions can include setting fault indicators for later use by a site technician. In another example, specific remediation steps (repair/replacement) are visualized for later remediation to be taken by an onsite technician.

The method continues, in step 940, by reporting modified node configurations, if any, to the DSN management unit. For example, during remediation of failed DSN node hardware components, new components with new features may be used as replacements. Where these replacement components include a different abstracted behavior, the abstracted DSN node hardware configuration is updated and reported back to the DSN managements unit 18. For example, the abstracted DSN node hardware configuration is modified to enable/disable specific hardware features (see FIG. 9A, 922).

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for performing remediation actions within a distributed storage network (DSN) including a plurality of DSN nodes residing in the DSN, each of the plurality of DSN nodes comprising associated hardware components, the method comprising the steps of:
   receiving, by a DSN management unit, abstracted DSN node hardware configurations from the plurality of DSN nodes, wherein DSN node configurations are determined automatically during deployment;
   periodically receiving, by the DSN management unit, modified abstracted DSN node configurations from the plurality of DSN nodes and associated DSN node health information for the plurality of DSN nodes, wherein DSN node configuration parameters specify a hardware abstraction configuration update to one or more DSN components of at least one of the plurality of the DSN nodes;
   generating a graphical display visualizing a state and a presence of each of the plurality of DSN nodes and the associated hardware components based on the DSN node health information; and
   performing, by the DSN management unit, specific remediating actions on the plurality of DSN nodes based on the visualizing a state and a presence of the plurality of DSN nodes and associated hardware components, the remediation actions including operably decoupling, by the DSN management unit, one or more failed hardware components to be replaced at a later date.

2. The method of claim 1, wherein the specific remediating actions further comprise visualizations of steps to repair or replace failed hardware components of the associated hardware components.

3. The method of claim 2, wherein the visualizations of steps to repair or replace the associated hardware components include instructions for later actions to be taken by an site technician.

4. The method of claim 1, wherein the specific remediating actions comprise setting fault indicators for later use by a site technician.

5. The method of claim 1 further comprises communicating, via the DSN management unit, the state and presence of the plurality of DSN nodes and associated hardware to an operator of the DSN through the graphical display.

6. The method of claim 1 further comprises modifying the abstracted DSN node hardware configuration to enable/disable specific hardware component features.

7. The method of claim 1 further comprises modifying the abstracted DSN node hardware configuration based on the specific remediation actions.

8. The method of claim 1 further comprises modifying the abstracted DSN node hardware configuration for failed hardware component replacements.

9. A computing device of a group of computing devices of a dispersed storage network (DSN), the computing device comprises:
- an interface;
- a local memory; and
- a processing module operably coupled to the interface and the local memory, wherein the processing module functions to:
  - gather at a DSN management unit, an abstracted DSN node hardware configuration and associated DSN node health information for a plurality of DSN nodes residing in the DSN, wherein the plurality of DSN nodes are configured automatically at deployment time;
- periodically receive at the DSN management unit, modified abstracted DSN node configurations from the plurality of DSN nodes and associated DSN node health information for the plurality of DSN nodes, wherein DSN node configuration parameters specify a hardware abstraction configuration update to one or more DSN components of at least one of the plurality of the DSN nodes;
  - generate a graphical display visualizing a state and a presence of each of the plurality of DSN nodes and associated hardware components; and
  - perform, at the DSN management unit, specific remediating actions on the plurality of DSN nodes based on the visualizing a state and a presence of the plurality of DSN nodes and associated hardware components.

10. The computing device of claim 9, wherein the specific remediating actions are visualizations of steps to repair or replace failed hardware components of the associated hardware components.

11. The computing device of claim 10, wherein the processing module further functions to operably decouple the failed hardware components to be replaced at a later date.

12. The computing device of claim 9, wherein the specific remediating actions comprise setting fault indicators for later use by a site technician.

13. The computing device of claim 9, wherein the processing module further functions to communicate, via the DSN management unit, the state and presence of the plurality of DSN nodes and associated hardware to an operator of the DSN through the graphical display.

14. The computing device of claim 9, wherein the processing module further functions to modify the abstracted DSN node hardware configuration to enable/disable specific hardware component features.

15. The computing device of claim 9 further comprises modifying the abstracted DSN node hardware configuration based on the specific remediation actions.

16. A method for execution by one or more processing modules of one or more computing devices of a dispersed storage network (DSN), the method comprises:
- determining a DSN node configuration based on abstracted DSN node hardware configuration information determined automatically at deployment of the DSN node;
- determining a status of hardware components and health of the DSN node;
- gathering, at a DSN management unit, the DSN node configuration, the status of hardware components and the health for a plurality of DSN nodes residing in the DSN, wherein DSN node configuration parameters specify components to be enabled or overridden, new values components parameters should be set to, which software releases to apply against, and a set of components to which an update applies;
- generating, based on the gathering, a graphical display visualizing a state and a presence of the plurality of DSN nodes and associated hardware components; and
- performing, at the DSN management unit, specific remediating actions on the plurality of DSN nodes based on the visualizing a state and a presence of the plurality of DSN nodes and associated hardware components.

17. The method of claim 16, wherein the specific remediating actions are visualizations of steps to repair or replace failed hardware components of the associated hardware components.

18. The method of claim 17 further comprises operably decoupling the failed hardware components to be replaced at a later date.

19. The method of claim 16, wherein the specific remediating actions comprise setting fault indicators for later use by a site technician.

20. The method of claim 1, wherein the DSN further comprises a computing device configured to disperse storage error encode data segments to produce sets of encoded data slices, provide the sets of encoded data slices with their respective slice names to storage units of the plurality of DSN nodes for storage, and retrieve select ones of the encoded data slices from the storage units of the plurality of DSN nodes; and
- wherein the DSN node configuration parameters further specify components to be enabled or overridden, new values component parameters should be set to, which software releases to apply against, and a set of components to which an update applies.

* * * * *